(12) United States Patent
Fahland et al.

(10) Patent No.: US 9,827,957 B2
(45) Date of Patent: Nov. 28, 2017

(54) METHOD AND APPARATUS FOR CONTROLLING VEHICLE DOWNFORCE

(71) Applicant: GM GLOBAL TECHNOLOGY OPERATIONS LLC, Detroit, MI (US)

(72) Inventors: Jason D. Fahland, Fenton, MI (US); Edward T. Heil, Howell, MI (US); Joshua R. Auden, Brighton, MI (US); Hualin Tan, Novi, MI (US); David Dominguez, Tucson, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/216,230

(22) Filed: Jul. 21, 2016

(65) Prior Publication Data
US 2017/0088106 A1 Mar. 30, 2017

Related U.S. Application Data

(60) Provisional application No. 62/232,499, filed on Sep. 25, 2015.

(51) Int. Cl.
| | |
|---|---|
| *B60T 8/17* | (2006.01) |
| *B62D 35/00* | (2006.01) |
| *B62D 37/02* | (2006.01) |
| *B60T 8/1755* | (2006.01) |
| *B60T 8/175* | (2006.01) |

(Continued)

(52) U.S. Cl.
CPC .......... *B60T 8/17551* (2013.01); *B60T 8/175* (2013.01); *B60T 8/1766* (2013.01); *B60T 8/17554* (2013.01); *B60T 8/17616* (2013.01); *B60T 8/26* (2013.01); *B62D 35/005* (2013.01); *B62D 35/007* (2013.01); *B62D 37/02* (2013.01);

(Continued)

(58) Field of Classification Search
CPC ...... B60T 8/17551; B60T 8/1766; B60T 8/26; B60T 8/17554; B60T 8/175; B60T 8/17616; B60T 2201/16; B60T 1/16; B62D 31/02; B62D 35/007; B62D 35/005; Y02T 10/88
See application file for complete search history.

(56) References Cited

U.S. PATENT DOCUMENTS

| | | | |
|---|---|---|---|
| 9,561,827 B2* | 2/2017 | Parry-Williams | ...... B62D 37/02 |
| 2015/0084372 A1* | 3/2015 | Green | ...................... B60T 1/16 296/180.5 |

(Continued)

*Primary Examiner* — Thomas Ingram
(74) *Attorney, Agent, or Firm* — Quinn IP Law

(57) ABSTRACT

A vehicle employing an active aerodynamic control system is described. A method for controlling the active aerodynamic control system includes determining a target acceleration downforce associated with an acceleration request and vehicle speed, determining a target braking downforce associated with a braking request and vehicle speed, and determining a target cornering downforce associated with a cornering request and vehicle speed. A maximum downforce request and a second greatest downforce request of the target acceleration downforce, the target braking downforce, and the target cornering downforce are determined. A preferred front/rear distribution of downforce is determined based upon the maximum downforce request and the second greatest downforce request. The active aerodynamic control system is controlled based upon the preferred front/rear distribution of downforce and the maximum downforce request.

19 Claims, 3 Drawing Sheets

(51) Int. Cl.
  *B60T 8/1761*    (2006.01)
  *B60T 8/1766*    (2006.01)
  *B60T 8/26*      (2006.01)
  *B60T 1/16*      (2006.01)

(52) U.S. Cl.
  CPC ............ *B60T 1/16* (2013.01); *B60T 2201/16* (2013.01); *Y02T 10/88* (2013.01)

(56) References Cited

U.S. PATENT DOCUMENTS

2016/0221613 A1* 8/2016 Handzel, Jr. ........... B62D 35/00
2016/0272257 A1* 9/2016 McKillen ............. B62D 35/005
2017/0088194 A1* 3/2017 Heil ....................... B62D 35/00

* cited by examiner

METHOD AND APPARATUS FOR CONTROLLING VEHICLE DOWNFORCE

CROSS-REFERENCE TO RELATED APPLICATIONS

This application claims the benefit of U.S. Provisional Patent Application No. 62/232,499 filed on Sep. 25, 2015, the disclosure of which is hereby incorporated by reference.

TECHNICAL FIELD

The disclosure relates to operation of a vehicle, including controlling ride and handling thereof.

BACKGROUND

Vehicle design related to aerodynamics includes factors affecting vehicle drag, wind noise, vehicle noise emissions, and lift forces that affect traction, cornering and other elements of vehicle stability. Aerodynamic design elements may include passive elements and actively controlled elements. Knowledge of the aerodynamic forces acting on the vehicle are required for precise control of an active aerodynamic system. Known aerodynamic systems are not actively controlled in response to downforce estimations associated with operation of the vehicle.

SUMMARY

A vehicle employing an active aerodynamic control system is described. A method for controlling the active aerodynamic control system includes determining a target acceleration downforce associated with an acceleration request and vehicle speed, determining a target braking downforce associated with a braking request and vehicle speed, and determining a target cornering downforce associated with a cornering request and vehicle speed. A maximum downforce request and a second greatest downforce request are determined based upon the target acceleration downforce, the target braking downforce, and the target cornering downforce. A preferred front/rear distribution of downforce is determined based upon the maximum downforce request and the second greatest downforce request. The active aerodynamic control system is controlled based upon the preferred front/rear distribution of downforce and the maximum downforce request.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

One or more embodiments will now be described, by way of example, with reference to the accompanying drawings, in which.

DETAILED DESCRIPTION

Figure 1:
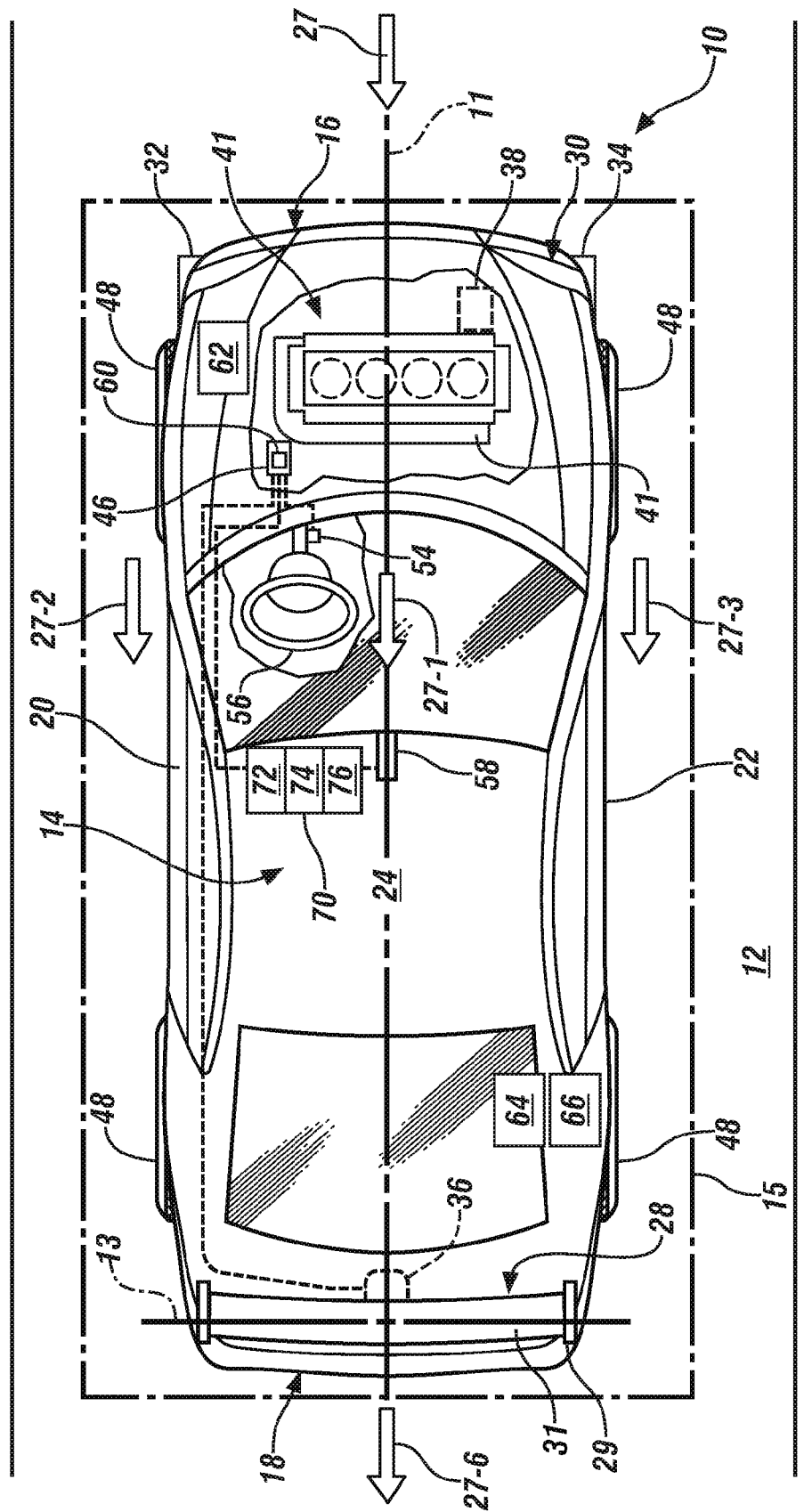
FIG. 1 is a schematic top view of a vehicle including an active aerodynamic control system including a moveable front spoiler assembly and a moveable rear spoiler assembly, in accordance with the disclosure.
Figure 2:
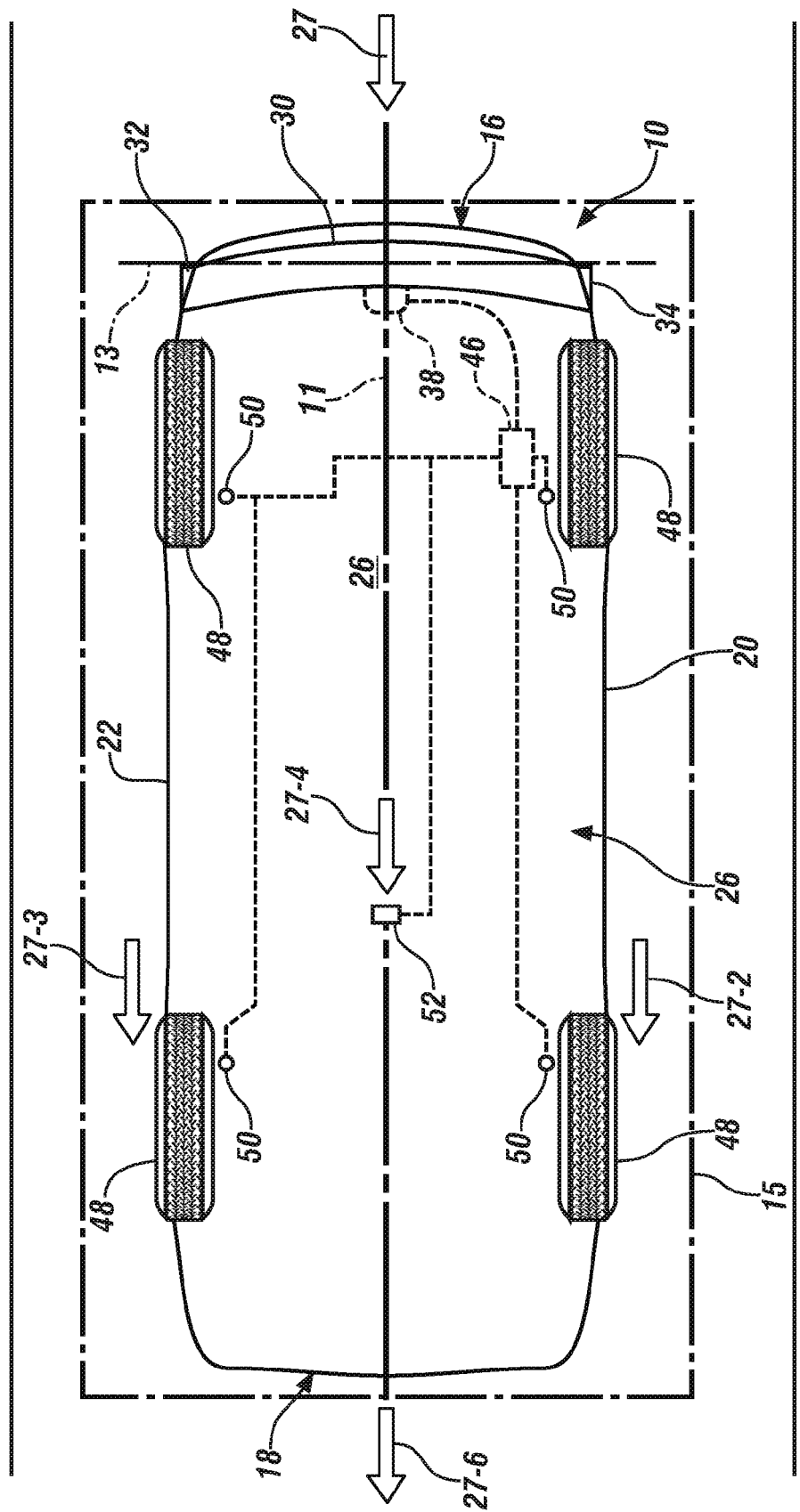
FIG. 2 is a schematic bottom view of the vehicle shown in FIG. 1, in accordance with the disclosure.
Figure 3:
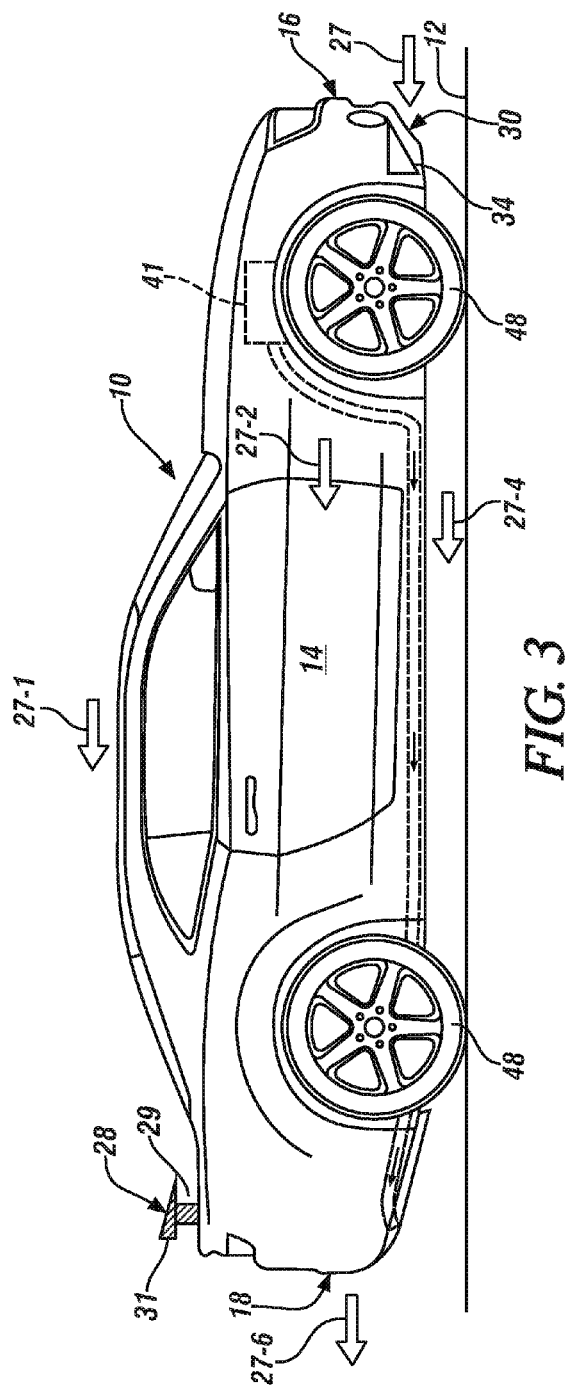
FIG. 3 is a schematic side view of the vehicle shown in FIGS. 1 and 2, in accordance with the disclosure.

Referring to the drawings, wherein like reference numbers refer to like components, FIG. 1 shows a top schematic view, FIG. 2 shows a bottom schematic view, and FIG. 3 shows a side schematic view of a motor vehicle 10 positioned relative to a road surface 12. The vehicle 10 includes a vehicle body 14 arranged in a body plane P 15 that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion. The vehicle 10 includes a drivetrain that includes a power plant 41 that mechanically couples via a geartrain to one or a plurality of road wheels 48 to transfer mechanical power thereto. The power plant 41 may be an internal combustion engine (shown in FIG. 1), a hybrid-electric powertrain (not shown), or another alternative type of power plant, and the geartrain may be an automatic transmission or another suitable geartrain. The motor vehicle 10 may be any suitable motor vehicle, including, by way of non-limiting examples, a passenger vehicle, a high-performance vehicle, or an off-road vehicle. Operation of the vehicle 10 may be controlled by a controller 46.

The vehicle 10 includes a nominal left side 20 and a nominal right side 22, which are disposed generally parallel to each other and with respect to a virtual longitudinal axis X 11 of the vehicle 10, and span the distance between the front end 16 and the rear end 18. The body plane P 15 is defined to include the longitudinal axis X 11. A passenger compartment (not shown) of the vehicle 10 is generally bounded by the front and rear ends 16, 18 and the left and right sides 20, 22 of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P 15 and along the longitudinal axis X 11.

As the vehicle 10 moves relative to the road surface 12, the ambient airflow 27 passes around the vehicle body 14 and splits into a first airflow portion 27-1, a second airflow portion 27-2, a third airflow portion 27-3, and a fourth airflow portion 27-4, that eventually rejoin in a recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 passes under the vehicle body 14, between the underbody portion 26 and the road surface 12. As understood by those skilled in the art, the recirculating airflow region 27-6 may be generally caused at elevated vehicle speeds by the flow of surrounding air around the six body sides of the vehicle body 14.

The vehicle 10 includes an active aerodynamic control system preferably including a moveable front spoiler assembly 30 and a moveable rear spoiler assembly 28. The rear spoiler assembly 28 includes a spoiler body 31 arranged along a spoiler axis Y 13 and configured to control movement of the ambient airflow 27 along the vehicle body 14. The spoiler body 31 may by connected to the vehicle body 14 via one or more stanchions 29, and may be wing-shaped in one embodiment. "Wing-shaped" is herein defined as having a shape of a wing, i.e., a fin having a shape of an airfoil defined by a streamlined cross-sectional shape producing lift for flight or propulsion through a fluid. As can be seen in FIG. 1, the spoiler axis Y 13 may be positioned orthogonal to the longitudinal axis X 11. The spoiler axis Y 13 positioned orthogonal to the longitudinal axis X 11 defines a lateral axis of the vehicle 10. Additionally, the spoiler axis Y 13 is also arranged substantially parallel to the body plane P 15. The rear spoiler assembly 28 varies a downforce $F_D2$ exerted by the ambient airflow 27 at the rear of the vehicle 10. The front spoiler assembly 30 may function as an air dam that varies a downforce $F_D1$ exerted by the ambient airflow 27 at the front of the vehicle 10, and may be employed to increase the downforce $F_D1$ at the front of the vehicle 10, while the spoiler assembly mounted on the rear end 18 may be employed to increase the downforce $F_D2$ at the rear of the vehicle 10 in order to increase vehicle traction. The front and rear spoiler assemblies 30, 28 may be formed from suitably rigid, low mass materials, such as an engineered plastic or aluminum, for structural stability. The rear spoiler assembly 28 also includes a rear mechanism 36 that is configured to alter the position of the spoiler assembly 28 in response to a control signal. The front spoiler assembly 30 may further include a first, left winglet 32 and a second, right winglet 34, each arranged substantially transversely with respect to the spoiler axis Y 13 and each arranged substantially vertically relative to the road surface 12 and facing the incident ambient airflow 27. As a result, the first and second winglets 32, 34 facilitate trapping pockets of air when the vehicle 10 is in motion. A front mechanism 38 is configured to alter the position of the front spoiler assembly 30 in response to a control signal, and may selectively shift each of the first winglet 32 and the second winglet 34 in a direction substantially transverse to the longitudinal axis X 11, and thereby adjust a magnitude of the aerodynamic downforce $F_D$ generated by the front spoiler assembly 30. The front and rear mechanisms 38, 36 may be composed of controllable actuators and suitable hinges, springs and other devices to facilitate movement in response to the respective control signals which originate from the controller 46. The controllable actuators may include, by way of non-limiting examples, electro-mechanical linear devices or rotary devices, pneumatically-controlled devices, or hydraulically-controlled devices.

The vehicle 10 preferably includes a plurality of sensors for monitoring vehicle operation related to vehicle ride and handling. A plurality of first sensors 50 may be arranged on the vehicle body 14 for detecting rotating speeds of each of the road wheels 48 (shown in FIG. 2). Each first sensor 50 may also be configured to communicate the detected rotating speed of the respective road wheel 48 to the controller 46, while the controller 46 may be configured to correlate the data received from the respective first sensors to road speed of the vehicle 10. The vehicle 10 may also include a second sensor 52 (shown in FIG. 2) configured to detect a yaw moment or rate on the vehicle body 14 relative to the road surface 12 and communicate the detected yaw rate to the controller 46. Additionally, the vehicle 10 may include a third sensor 54 disposed to monitor a steering wheel 56 (shown in FIG. 1) to detect an angle of the steering wheel during operation of the vehicle 10. An intended direction of the vehicle 10 may be identified by the steering wheel angle detected by the third sensor 54 and communicated to the controller 46. The vehicle 10 may additionally include a fourth sensor 58 (shown in FIG. 1) configured to detect the velocity of the ambient airflow 27 relative to the vehicle 10. The fourth sensor 58 may be additionally configured to communicate the detected velocity of the ambient airflow to the controller 46. The fourth sensor 58 may be, for example, a pitot tube configured to detect a pressure of the ambient airflow 27 at a specific location relative to the vehicle body 14. The controller 46 may execute instructions that correlate the measured pressure to airflow velocity. The aforementioned sensors may be in the form of rotational position sensors, linear position sensors, ultrasonic sensors, laser sensors and inertial-based acceleration sensors. A heading angle calculation may be determined from a pitot tube or other vehicle dynamics information providing inertial estimates. An air density calculation may be derived from manifold absolute pressure and outside air temperatures.

The vehicle 10 includes one or a plurality of systems for actively controlling vehicle ride and handling. This may include one or more routines for controlling position(s) of the front and rear spoiler assemblies 30, 28. This may include an active suspension system 62 that is configured to adjust suspension damping and/or front and rear ride heights in response to a control signal that is based upon operating conditions. Active suspension systems are known. The vehicle 10 may include an active braking system 64 that may include anti-lock braking for controlling wheel braking in response to an operator braking command, and other features. The vehicle 10 may include an active steering system 66 that may control vehicle steering rates in response to operating conditions. Active braking systems 64 and active steering systems 66, including associated controllers and control routines are known.

The controller 46 is an electronic device that is configured, i.e., constructed and programmed, to control one or more of the front mechanism 38, the rear mechanism 36, the active suspension system 62, the active braking system 64, and the active steering system 66 in response to vehicle operator commands and inputs from the sensors, e.g., the yaw rate detected by the second sensor 52. The controller 46 may be a dedicated controller or have functions that are integrated into another controller. Alternatively, there may be a plurality of controller devices associated with each of the aforementioned systems.

The controller 46 communicates with an operator interface 70 to determine vehicle operator commands. The operator interface 70 includes a plurality of human/machine interface devices through which the vehicle operator commands operation of the vehicle 10, including, e.g., an accelerator pedal 72, a brake pedal 74, a transmission range selector 76 and a steering wheel 56. The accelerator pedal 72 provides a signal including an accelerator pedal position indicating an operator request for vehicle acceleration. The brake pedal 74 provides a signal including a brake pedal position indicating an operator request for vehicle braking or deceleration. The transmission range selector 76 provides a signal indicating direction of operator-intended motion of the vehicle 10 including a discrete number of operator-selectable positions that indicate a preferred direction of vehicle travel in either a forward or a reverse direction. The transmission range selector 76 may also include a tap-up/tap-down lever, which provides an operator with a capability to request a transmission gear upshift or downshift.

The controller 46 may be configured to control one or more of the front mechanism 38, the rear mechanism 36, the active suspension system 62, the active braking system 64, and the active steering system 66 in response to the rotating speeds of the road wheels 48 detected via the first sensor 50 and/or the velocity of the ambient airflow 27 detected via the fourth sensor 58. The controller 46 may be additionally programmed to determine a slip of the vehicle 10 relative to the road surface 12. The slip of the vehicle 10 may include a measure of how much each of the road wheels 48 has slipped laterally in relation to the longitudinal axis X 11, which may indicate that the vehicle 10 has deviated from the intended direction or path along the road surface 12 as identified by the steering wheel angle detected by the third sensor 54. The controller 46 may be programmed to compare the determined steering wheel angle and yaw rate to determine how much the vehicle 10 has deviated from its intended direction or path.

The controller 46 may be configured as a central processing unit (CPU) that is also configured to regulate operation of the power plant 41, or, alternatively, the controller 46 may be a dedicated controller. As such, there may be a plurality of controller devices distributed throughout the vehicle 10, with each controller configured to manage and control operation of a particular system or subsystem. In order to appropriately control operation of the front mechanism 38, the controller 46 includes a memory storage device 60, at least some of which is tangible and non-transitory. The memory storage device 60 may be any recordable medium that participates in providing computer-readable data or process instructions. Such a medium may take many forms, including but not limited to non-volatile media and volatile media.

Non-volatile media for the controller 46 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 46 may also include a floppy disk, a flexible disk, hard disk, magnetic tape, any other magnetic medium, a CD-ROM, DVD, any other optical medium, etc. The controller 46 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 46 or accessible thereby may be stored in the memory 60 and automatically executed to provide the required functionality.

Figure 4:
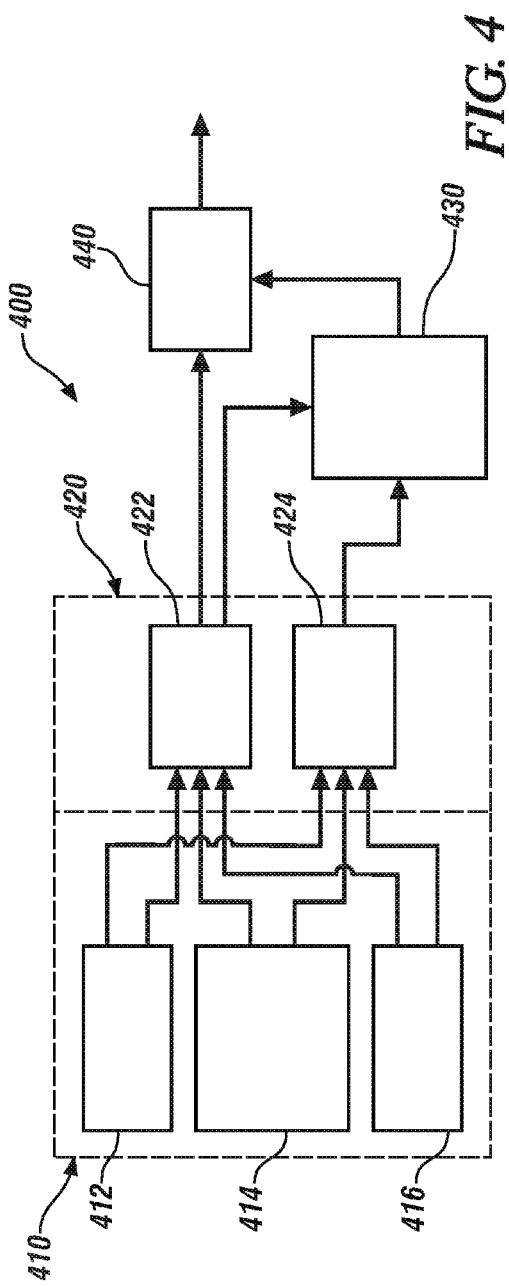
FIG. 4 is a schematic block diagram of a control routine for controlling a vehicle, in accordance with the disclosure.

FIG. 4 schematically shows an active aerodynamic control routine 400 for controlling a vehicle equipped with an active aerodynamic control system, e.g., an embodiment of the vehicle 10 described with reference to FIGS. 1, 2 and 3. The active aerodynamic control routine 400 includes determining a plurality of target downforces (410), including determining a target acceleration downforce (412), determining a target braking downforce (414), and determining a target cornering downforce (416).

For purposes of this disclosure, the term "downforce" is defined as the forces acting upon the vehicle body and transferred to the vehicle wheels in response to aerodynamic characteristics of the vehicle body when traveling at a known vehicle speed, including those aerodynamic forces that act upon a front spoiler assembly and/or a rear spoiler assembly on vehicles so equipped. The magnitude of the downforce affects tire friction, and thus affects tractive effort by the vehicle 10 including occurrence of longitudinal wheel slip that may occur during vehicle acceleration and lateral wheel slip that may occur during vehicle cornering. An active aerodynamic control system can control downforce by controlling positions of a front spoiler assembly and a rear spoiler assembly, e.g., the front spoiler assembly 30 and the rear spoiler assembly 28 of the vehicle 10 described with reference to FIGS. 1, 2 and 3.

A target downforce is a magnitude of downforce that maximizes vehicle acceleration for a magnitude of driveline torque, thus permitting minimum wheel slip while transferring torque to the ground surface without generating excessive drag force on the vehicle 10. A minimum wheel slip is a magnitude of wheel slip that is achievable in response to the driveline torque without having to induce driveline torque reduction, and may be within a range between 0% and 15% in one embodiment. Torque transferred to the ground surface may be in the form of forward thrust when accelerating, or in the form of vehicle braking when decelerating. The target downforce is specific to a particular vehicle body design and configuration of the vehicle 10.

The vehicle 10 is preferably characterized to determine a target downforce for the vehicle 10 when subjected to variation in a single degree of freedom, e.g., when accelerating, when decelerating, or when cornering (410). This preferably includes determining the target acceleration downforce request (412), determining the target braking downforce request (414), and determining the target cornering downforce request (416).

The target acceleration downforce request (412) is a magnitude of downforce that maximizes vehicle acceleration when the vehicle 10 is operating in a straight line and achieves an optimum magnitude of longitudinal wheel slip while transferring torque to the ground surface without generating excessive drag force on the vehicle 10. The target acceleration downforce is based upon an operator acceleration request and a present vehicle speed, and takes into account vehicle acceleration torque, vehicle speed in comparison with wheel speed, longitudinal wheel slip, and other factors.

The target braking downforce request (414) is a magnitude of downforce that maximizes vehicle braking when the vehicle 10 is operating in a straight line and achieves an optimum magnitude of longitudinal wheel slip while transferring torque to the ground surface. The target deceleration downforce is based upon a magnitude of operator requested braking torque and a present vehicle speed, and takes into account vehicle torque, vehicle speed in comparison with wheel speed, longitudinal wheel slip, and other factors.

The target cornering downforce request (416) is a magnitude of downforce that minimizes or optimizes lateral wheel slip without generating excessive drag force on the vehicle 10 when the vehicle 10 is traversing a curve. The target cornering downforce is based upon a steering angle request, a present steering angle and a present vehicle speed, and takes into account an operator-requested lateral acceleration rate, vehicle speed in comparison with wheel speed, lateral wheel slip, and other factors.

Calibrations for the target acceleration downforce request (412), the target braking downforce request (414) and the target cornering downforce request (416) may be developed for the vehicle 10 employing on-vehicle testing on test roads, on-vehicle testing in a wind tunnel, and physics-based analytical techniques. The subject vehicle may be evaluated in a wind tunnel to experimentally derive an aerodynamic characteristic map. As understood by those skilled in the art, a wind tunnel simulates movement of air around a vehicle under controlled wind speed, temperature and other conditions to determine magnitudes of forces acting upon the vehicle 10 with the vehicle controlled under various parameters. Such parameters include front and rear vehicle ride height, pitch, roll, heading angle, air velocity, vehicle velocity, and position(s) of one or more aerodynamic actuators such as front spoilers and rear spoilers. Evaluating the vehicle 10 in a wind tunnel may include identifying a plurality of vehicle-related factors, determining a plurality of levels for each of the factors, and determining a plurality of related responses. An experiment design may be developed, which may include a multi-level full factorial matrix for evaluating the vehicle 10.

The target acceleration downforce request 412, the target braking downforce request 414 and the target cornering downforce request 416 are evaluated (420). This includes comparing the target acceleration downforce request 412, the target braking downforce request 414 and the target cornering downforce request 416 to identify a maximum downforce request and its associated state, i.e., one of the acceleration downforce, braking downforce and cornering downforce (422). The target acceleration downforce request 412, the target braking downforce request 414 and the target cornering downforce request 416 are further compared to identify a second greatest downforce request and its associated state, i.e., one of the acceleration downforce, braking downforce and cornering downforce (424).

A bias routine 430 evaluates the state associated with the maximum downforce request 422 and the state associated with the second greatest downforce request 424 to determine a preferred downforce distribution, including a front/rear downforce distribution and, in one embodiment a left/right downforce distribution. In one embodiment, the downforce distribution may be determined based upon a ratio of the maximum downforce request 422 and the second greatest downforce request 424, wherein the total downforce is based upon the maximum downforce request 422 and the downforce distribution is in the form of a suggested or first percentage of the maximum downforce request applied to the front of the vehicle 10 and a remaining percentage of the maximum downforce request applied to the rear of the vehicle 10. Alternatively, or in combination, there may be another distribution of the downforce request between the left side and the right side of the vehicle 10. The suggested front/rear downforce distribution is generated based upon the two dynamic states that are most active, i.e., the two dynamic states that generate the greatest downforce requests. This suggested front/rear downforce distribution may be determined via an interpolation, and the interpolation may be weighted or dynamically weighted based on the optimal downforce bias of those two dynamic states. The maximum magnitude of downforce request and the suggested or target front/rear distribution is communicated to a controller, e.g., controller 46, which controls positions of the front and rear spoiler assemblies 30, 28 in response (440).

As such, the active aerodynamic control routine 400 simultaneously considers several vehicle dynamic states including, but not limited to, acceleration, braking, and cornering. Information for these states can be generated from different sources and may be purely feedback, purely feedforward, or a combination of both. The active aerodynamic control routine 400 may dynamically operate to control a single controllable aerodynamic surface, e.g., the controllable rear spoiler assembly 28, or multiple aerodynamic surfaces, e.g., as described with reference to FIGS. 1, 2 and 3.

The active aerodynamic control routine 400 dynamically determines a preferred downforce request for each dynamic state during vehicle operation. The associated calibrations and implementations advantageously facilitate accurately optimizing downforce while balancing the downforce distribution over the entire vehicle 10 without having to characterize the entire vehicle 10, thus avoiding development complexity. This may facilitate vehicle stability at higher vehicle speeds and also facilitates maneuverability at lower vehicle speeds. Such a system may simplify pre-production calibration efforts related to aerodynamic mapping and reduce a need for on-vehicle characterizations to optimize vehicle dynamics. There is also less dependence upon physics-based assumptions and estimations related to tire properties, which change constantly and are difficult to model effectively. The execution of the active aerodynamic control routine 400 may improve vehicle stability and ride and handling performance and reduce vehicle drag.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for controlling an active aerodynamic control system disposed on a vehicle, comprising:
   determining a target acceleration downforce associated with an acceleration request and a vehicle speed;
   determining a target braking downforce associated with a braking request and the vehicle speed;
   determining a target cornering downforce associated with a cornering request and the vehicle speed;
   determining a maximum downforce request based upon the target acceleration downforce, the target braking downforce, and the target cornering downforce;
   determining a second greatest downforce request based upon the target acceleration downforce, the target braking downforce, and the target cornering downforce;
   determining a preferred front/rear distribution of downforce based upon the maximum downforce request and the second greatest downforce request; and
   controlling the active aerodynamic control system based upon the preferred front/rear distribution of downforce and the maximum downforce request.

2. The method of claim 1, wherein determining a target acceleration downforce associated with an acceleration request and a vehicle speed comprises determining a magnitude of downforce that maximizes vehicle acceleration when the vehicle is operating in a straight line.

3. The method of claim 2, wherein determining the magnitude of downforce that maximizes vehicle acceleration when the vehicle is operating in a straight line comprises determining a magnitude of longitudinal wheel slip while transferring torque to the ground surface without generating an excessive drag force on the vehicle based upon an operator acceleration request, a present vehicle speed, a vehicle acceleration torque, and the vehicle speed in comparison with a wheel speed.

4. The method of claim 1, wherein determining a target braking downforce associated with a braking request and the vehicle speed comprises determining a magnitude of downforce that maximizes vehicle braking when the vehicle is operating in a straight line and achieves an optimum magnitude of longitudinal wheel slip while transferring a torque to the ground surface.

5. The method of claim 4, wherein the magnitude of downforce that maximizes vehicle braking when the vehicle is operating in a straight line and achieves an optimum magnitude of longitudinal wheel slip while transferring torque to the ground surface is based upon a magnitude of an operator requested braking torque and a present vehicle speed based upon a vehicle torque and a comparison of the vehicle speed and a wheel speed.

6. The method of claim 1, wherein determining a target cornering downforce associated with a cornering request and the vehicle speed comprises determining a magnitude of downforce that minimizes lateral wheel slip and drag force on the vehicle when traversing a curve.

7. The method of claim 6, wherein the magnitude of downforce that minimizes lateral wheel slip and drag force on the vehicle when traversing a curve is based upon a steering angle request, a present steering angle and vehicle speed, an operator-requested lateral acceleration rate, a comparison of the vehicle speed and the wheel speed, and the lateral wheel slip.

8. The method of claim 1, wherein determining a preferred front/rear distribution of downforce based upon the maximum downforce request and the second greatest downforce request comprises determining a ratio of the maximum downforce request and the second greatest downforce request.

9. The method of claim 8, comprising applying a first percentage of the maximum downforce request to a front of the vehicle and applying a remaining percentage of the maximum downforce request to a rear of the vehicle.

10. The method of claim 1, wherein determining a preferred front/rear distribution of downforce based upon the maximum downforce request and the second greatest downforce request comprises interpolating between the maximum downforce request and the second greatest downforce request, wherein the interpolation is dynamically weighted based on a downforce bias of the maximum downforce request and the second greatest downforce request.

11. The method of claim 1, further comprising:
determining a preferred left/right distribution of downforce based upon the maximum downforce request and the second greatest downforce request; and
controlling the active aerodynamic control system based upon the preferred left/right distribution of the maximum downforce request and the maximum downforce request.

12. The method of claim 1, wherein the active aerodynamic control system includes a moveable front spoiler assembly and a moveable rear spoiler assembly, and wherein controlling the active aerodynamic control system based upon the preferred front/rear distribution of downforce and the maximum downforce request comprises controlling positions of the moveable front spoiler assembly and the moveable rear spoiler assembly.

13. A motor vehicle, comprising:
a plurality of road wheels;
a drivetrain including a power plant mechanically coupled via a geartrain to one of the road wheels;
an active aerodynamic control system including a controllable front spoiler assembly and a controllable rear spoiler assembly;
a plurality of sensors for monitoring vehicle operation related to vehicle ride and handling; and
an electronic controller in communication with the plurality of sensors and operatively connected to the active aerodynamic control system, the controller including an instruction set, the instruction set executable to:
determine a target acceleration downforce associated with an acceleration request and a vehicle speed,
determine a target braking downforce associated with a braking request and the vehicle speed,
determine a target cornering downforce associated with a cornering request and the vehicle speed,
determine a maximum downforce request based upon the target acceleration downforce, the target braking downforce, and the target cornering downforce,
determine a second greatest downforce request based upon the target acceleration downforce, the target braking downforce, and the target cornering downforce,
determine a preferred front/rear distribution of downforce based upon the maximum downforce request and the second greatest downforce request, and
control the active aerodynamic control system based upon the preferred front/rear distribution of downforce and the maximum downforce request.

14. The motor vehicle of claim 13, wherein the plurality of sensors for monitoring vehicle operation related to vehicle ride and handling comprises:
a plurality of first sensors disposed to monitor rotating speeds of each of the road wheels;
a second sensor disposed to detect a yaw moment of the vehicle;
a third sensor disposed to monitor an angle of a steering wheel; and
a fourth sensor disposed to monitor a velocity of ambient airflow relative to the vehicle.

15. The motor vehicle of claim 13, wherein the instruction set executable to determine the target acceleration downforce associated with the acceleration request and the vehicle speed comprises an instruction set executable to determine a magnitude of downforce that maximizes a vehicle acceleration when the vehicle is operating in a straight line, wherein the magnitude of downforce that maximizes the vehicle acceleration when the vehicle is operating in a straight line is determined based upon a magnitude of longitudinal wheel slip while transferring torque to the ground surface and a drag force on the vehicle.

16. The motor vehicle of claim 13, wherein the instruction set executable to determine the target braking downforce associated with the braking request and the vehicle speed comprises an instruction set executable to determine a magnitude of downforce that maximizes vehicle braking when the vehicle is operating in a straight line and achieves an optimum magnitude of longitudinal wheel slip while transferring torque to the ground surface based upon a magnitude of an operator requested braking torque and a vehicle speed.

17. The motor vehicle of claim 13, wherein the instruction set executable to determine the target cornering downforce associated with a cornering request and the vehicle speed comprises an instruction set executable to determine a magnitude of downforce that minimizes lateral wheel slip and drag force on the vehicle when traversing a curve based upon a steering angle request, a steering angle and a vehicle speed, and an operator-requested lateral acceleration rate.

18. The motor vehicle of claim 13, wherein the instruction set executable to determine a preferred front/rear distribution of downforce based upon the maximum downforce request and the second greatest downforce request comprises interpolating between the maximum downforce request and the second greatest downforce request, wherein the interpolation is dynamically weighted based on a downforce bias of the maximum downforce request and the second greatest downforce request.

19. The motor vehicle of claim 13, wherein the instruction set is further executable to:
   determine a preferred left/right distribution of downforce based upon the maximum downforce request and the second greatest downforce request; and
   control the active aerodynamic control system based upon the preferred left/right distribution of the maximum downforce request and the maximum downforce request.

* * * * *